March 14, 1939. W. O. KEELING 2,150,170
METHOD OF TREATING RAW GASOLINE DISTILLATES
Original Filed March 10, 1932
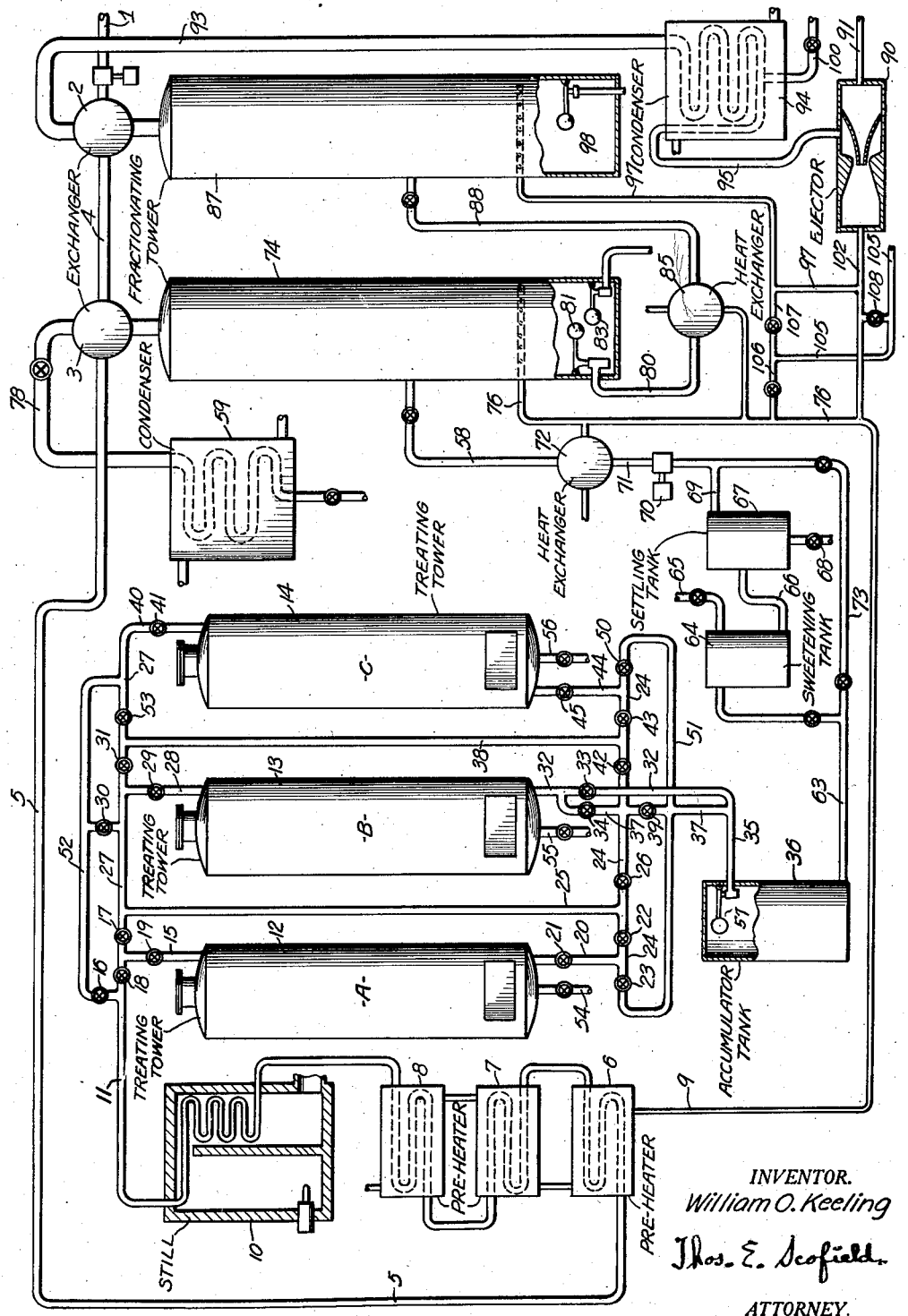
INVENTOR.
William O. Keeling
Thos. E. Scofield
ATTORNEY.

Patented Mar. 14, 1939

2,150,170

UNITED STATES PATENT OFFICE 2,150,170

METHOD OF TREATING RAW GASOLINE DISTILLATES

William O. Keeling, Pittsburgh, Pa.

Application March 10, 1932, Serial No. 597,954
Renewed April 16, 1936

2 Claims. (Cl. 196—33)

My invention relates to a process for the continuous treating of mineral oils and an apparatus therefor, and while not limited thereto, is particularly concerned with oils of the gasoline range, such, for example, as raw gasoline distillates as received from a cracking system.

One object of my invention is to provide an improved method and apparatus which will yield a superior product at decreased cost and which will have substantial advantages from an operating standpoint.

Another object of my invention is to provide a continuous process of treating and distilling such oil, and to this end to provide means for continuously treating the oil with adsorbents and then continuously feeding the oil so treated with or without a previous desulphurizing treatment into a fractionating column adapted for continuous operation.

A further object of my invention is to provide an improved method of distillation involving a plurality of stages, in the first of which the oil is subjected to steam distillation to remove lighter fractions and in the latter stages to vacuum distillation to distill heavier fractions. By virtue of this combination of steps, improved operation and greater economy of steam are achieved.

Still another object of my invention is to utilize the energy of steam to produce a vacuum in the latter stages and to return the exhaust steam, preferably with residual uncondensed vapors, to one or more of the distillation zones.

Further objects and advantages will be apparent as the description proceeds and the novel features will be particularly pointed out in the claims.

The invention will be best understood by reference to the following detailed description thereof, taken with the annexed drawing which shows somewhat diagrammatically a plant embodying the preferred form of the invention.

Having reference now to the drawing, oil to purified is admitted to the system through a pipe 1 leading to a heat exchanger or reflux-condenser 2, thence preferably to a second heat exchanger 3 through a pipe 4, thence through a pipe 5 to oil preheaters 6, 7 and 8. In exchangers 2 and 3 the oil is heated by vapors from the fractionating towers shown beneath these exchangers, the operation of which will be gone into more fully hereinafter. In preheaters 6, 7 and 8, the oil is further heated by steam from line 9 to as high a degree as practicable, after which it is passed through a still 10 of any suitable type, wherein its temperature may be raised up to as high as 700° F., depending upon the nature of the oil to be treated. From heater 10 the oil, which is still maintained in the liquid state, is passed through pipe 11 to one of preferably three vessels 12, 13 and 14 filled with a suitable adsorbent such as fuller's earth or other suitable clay, charcoal or silica gel. The vessels 12, 13, and 14 are connected so as to enable two of the vessels to be joined in series while the third vessel is being cleaned out, whereby a continuous treatment of the oil is accomplished and a continuous supply of the treated oil fed to the fractionating towers, to be described, which are adapted for continuous operation.

The connections and manner of accomplishing this are as follows: Calling containers 12, 13 and 14, respectively, A, B, and C, the following schedule will ordinarily be maintained:

(1) Containers A and B will be operated until A is spent and B is half spent, approximately;

(2) Containers B and C will be operated until B is spent and C is half spent;

(3) Containers C and A will be operated until C is spent and A is half spent. In each case the container not mentioned will be cleaned out and supplied with fresh material. To operate numbers A and B in series, for example, the oil passing through pipe 11 will enter container A through branch pipe 15, valves 16 and 17 being closed and valves 18 and 19 being opened. Leaving the container, the partially purified oil will pass through pipe 20, valves 21 and 22 being opened and valve 23 being closed. The oil will then pass through horizontal connection 24 to vertically extending pipe 25, valve 26 being closed. The oil passing up through pipe 25 enters the portion of pipe 27 to the right of pipe 25 and descends through branch pipe 28 into container B, valve 29 being opened and valves 30 and 31 being closed. The oil passes downwardly through container B and leaves same through a pipe 32, valve 33 being opened and valve 34 being closed. Thence it passes through pipe 35 to accumulator tank 36.

In operating towers B and C in series, the oil passes through pipe 11, valves 16 and 19 being closed and valves 17 and 18 being opened, to downtake 28 leading to container B. It is also necessary that valves 22 and 26 in connection 24 be closed. Oil percolates through container B and leaves same through a branch conduit 37 from which it passes to the right through connection 24 to uptake 38, valve 39 in pipe 37 being closed. The oil passing upwardly through pipe 38 reaches that portion of pipe 27 to the right of pipe 38 and then passes downwardly through pipe 40, valve 41 being opened. Also valve 42 in connection 24 is opened and valve 43 is closed. Oil percolates downwardly through container C and leaves same through pipe 44, valves 45 and 50 being opened, the oil thereby passing around through the lower portion 51 of connection 24 to branch pipe 37 and thence out to exit pipe 35, to the accumulator tank, as before.

When containers C and A are connected in series, the oil passes through pipe 11 to valve 18 which is closed, then through the valve 16 which is opened, into branch pipe 52 to that portion of pipe 27 above container C and thence through downtake 40 into container C, valve 41 being opened and valves 30 and 53 being closed. Oil passes through container C and leaves same through connections 44 and 24, valve 50 being closed and valves 45, 43, 42 and 26 being opened and valve 22 being closed. This enables the oil to pass upwardly through pipe 25, through valve 17 into downtake 15 and into container A. From container A the oil passes through outlet 20, opened valves 21 and 23, through connection 51 to branch pipe 37 to outlet 35.

In addition to the foregoing, each container has a drain connection 54, 55 and 56 respectively.

This feature of the invention is not limited to treating in the liquid phase, but contemplates as well, treating in the vapor phase. The treating vessels A, B and C may be provided with heated jackets.

Oil which is delivered from the system of the three containers through pipe 35 is now fed into a collecting vessel or surge tank 36, pipe 35 being provided with a float valve 57.

While I have shown three treating vessels, it will be obvious that any number of treating vessels may be used in a manner similar to that described, it being a salient feature of my invention that part of the treating material shall always be comparatively fresh.

It is a feature of my invention to provide for a continuous sweetening or doctor treatment of the oil subsequent to the treatment with adsorbents and prior to the distillation and without having to release the pressure upon the oil. The purpose of the sweetening or doctor treatment is to eliminate sulphur in its objectionable form as mercaptans and otherwise to improve the odor and non-gumming qualities of the oil. To this end, the oil is continuously withdrawn from tank 36 through pipe 63 to mixing and treating tank 64 wherein the oil is subjected to treatment with the sweetening agents admitted under the requisite pressure through pipe 65. From tank 64 the treated oil passes through pipe 66 to a settling tank 67 having a drain 68 through which the precipitated matter is continuously withdrawn. From tank 67 the sweetened oil is continuously withdrawn through pipe 69 whence it passes by the aid of pump 70 to pipe 71 and heater 72. In order that the sweetening step may if desired be omitted at this point, a valved by-pass 73 is provided between pipe 63 and pump 70.

The oil is now preheated in the heater 72 to a temperature which will vary depending upon the nature of the oil being treated, such temperature ranging as a rule between 150 and 700° F. Where it is necessary to employ the higher temperatures, an oil fired heater of the type shown at 10 will be employed. The heated oil, maintained preferably substantially in the liquid phase, is now admitted to a fractionating column or bubble tower 74 through valved line 58 wherein the pressure on the oil is released and the lighter fractions vaporized by the heat imparted thereto in the heater 72 and also by the aid of live steam admitted through pipe 76. Vapors from column 74 pass upwardly through reflux condenser 3 and out through valve controlled pipe 78 to a condenser 59. Conditions are so regulated in the column 74 and heat exchanger 3 that only a portion of the vaporizable components are removed. The residue is collected at the bottom of the tower and is drawn off through pipe 80 which is provided with a float control valve 81. A float control valve 83 beneath valve 81 provides for the drawing off of water collecting at the bottom of the tower. The residue passes through pipe 80, is further heated in the heater 85 and thence is admitted to a second fractionating tower 87 through pipe 88. Tower 87 is similar to tower 74 structurally but is operated under reduced pressure produced preferably by means of an ejector 90 connected with a steam source 91. The top of the tower 87 is connected with reflux condenser 2 which in turn is joined by pipe 93 to surface condenser 94. A pipe 95 connects condenser 94 with ejector 90. A float valve 96 provides for the removal of liquid residue from the tower 87. Along with the vacuum I may wish to use live steam, and for this purpose steam is admitted to column 87 through pipe 97. The action in the tower 87 is the same as that in column 74 except for the fact that tower 87 is maintained under reduced pressure thereby effecting the distillation of the remainder of components of the oil which it is desired to evaporate. The vapors passing off through pipe 93 are condensed in surface condenser 94 provided with a draw-off 100. The exhaust steam from condenser 94 together with any residual vapors escaping condensation pass off through pipe 95 into ejector 90, thence through pipe 102, whence it passes to feed line 76 leading to column 74 and feed line 97 to column 87 and also through line 9 to heaters C, 7 and 8. In order that additional steam may be available if needed, a separate line 105 is provided having valve branches 106 and 107 leading to lines 76 and 97, respectively, and also valved connection 108 to line 102.

The use of a plurality of evaporating devices, at least one of which is operated with live steam and at least one of which is operated under vacuum, is highly advantageous for the reason that I have found that vacuum distillation of the raw distillate containing the volatile ends results in excessive foaming because of the high volatility of the lighter fractions and because of the air and gases contained therein. On the other hand, if the evaporation of all of the oil be effected by the use of steam under atmospheric pressure, the evaporation of the heavy ends is rendered difficult and is wasteful of steam. However, by first subjecting the oil to a steam distillation, the light ends are easily removed together with dissolved air and other gases making it much easier to maintain the vacuum in the second stage. Moreover, the use of steam to draw the vacuum results in considerable economy since full utilization is made of the exhaust steam. Furthermore, by the use of the ejector, any light vapors that escape condensation are entrained with the system and are thereby returned to the system.

It will be obvious that instead of an ejector for maintaining the vacuum, a steam pump may be used and the exhaust steam therefrom utilized in the same way that the exhaust steam from the ejector is utilized, but I prefer the use of the ejector for the reason that the recovery of the uncondensed vapors is best effected.

It will further be noted that in addition to providing a continuous system of oil treatment, I carry out the treatment with an adsorbent material under advantageous conditions by first heating the oil to an elevated temperature while maintaining it in the liquid phase, then while in such phase, passing it through the adsorbent material and then utilizing the heat in the oil to bring about vaporization of a portion thereof by releasing the pressure on the oil in a fractionating tower. It will be noted that since the oil is heated separately, operating difficulties that occur when the oil and adsorbent material are heated together are voided, such for example, as the baking of the adsorbent upon the heating surface which necessitates frequent shut-downs and causes excessive wear on the apparatus.

By sweetening the oil between the adsorbent treatment and the distillation, the gasoline does not have to be sweetened after distillation and the tendency for formation of color bodies and the gum precipitation is minimized.

It will be noted that because the distillation of the material is carried out in two stages, the second stage being under vacuum, the temperature may be kept below a predetermined value, e. g. in the neighborhood of 400° F. This is of considerable advantage because following the "doctor" (or hypochlorite) treatment it is desirable that the temperature in the subsequent distillation be not raised above a comparatively low value, as otherwise the oil may subsequently become "sour" and require a further doctor treatment. By the use of my process, not only is this desirable low temperature maintained, but the entire operation is rendered continuous.

It will be understood that various changes may be made in the process which I have described in detail and that steps may be omitted and others added, all without departing from the spirit of my invention or the scope of the claims appended herewith. For example, it may be desirable in many instances, to sweeten the oil while cold and before the treatment with adsorbents. In certain of the claims, by the expression "doctor treatment" I intend to include any treatment having for its specific purpose the sweetening of gasoline.

Having thus described my invention, what I claim is:

1. A continuous process for treating hydrocarbons including the steps of heating hydrocarbons, passing the heated hydrocarbons through a series of beds of adsorbent material, including at all times one bed in the series but partly spent, and while still hot passing the hydrocarbons so treated in contact with sodium plumbite, settling the doctor treated hydrocarbons, and subsequently fractionating said hydrocarbons in two stages, the first of said stages being under atmospheric pressure and the second of said stages being under subatmospheric pressure.

2. The method of treating raw gasoline distillates including the steps of heating the same while maintaining it under pressure sufficient to keep the hydrocarbons being heated in the liquid phase, continuously passing the hydrocarbons in the liquid phase through a series of beds of adsorbent material, subjecting the thus treated material to a sweetening treatment without releasing the pressure thereon, heating the sweetened hydrocarbons and fractionating the same in an atmospheric stage of fractionation and a subsequent subatmospheric stage.

WILLIAM O. KEELING.